United States Patent

Hull et al.

[11] Patent Number: 5,806,005
[45] Date of Patent: Sep. 8, 1998

[54] WIRELESS IMAGE TRANSFER FROM A DIGITAL STILL VIDEO CAMERA TO A NETWORKED COMPUTER

[75] Inventors: Jonathan J. Hull, Cupertino; John F. Cullen, Redwood City, both of Calif.

[73] Assignees: Ricoh Company, Ltd., Tokyo, Japan; Ricoh Corporation, Menlo Park, Calif.

[21] Appl. No.: 644,349
[22] Filed: May 10, 1996
[51] Int. Cl.$^6$ ............................................. H04M 11/00
[52] U.S. Cl. ......................................... 455/566; 348/17
[58] Field of Search ............................ 379/59; 348/12, 348/13, 14, 15, 17, 222, 552; 455/33.1, 408, 566, 418, 419

[56] References Cited

U.S. PATENT DOCUMENTS

| | | | |
|---|---|---|---|
| 5,220,420 | 6/1993 | Hoarty et al. | 358/86 |
| 5,485,504 | 1/1996 | Ohnsorge | 455/566 |
| 5,491,507 | 2/1996 | Umezawa et al. | 455/566 |
| 5,546,445 | 8/1996 | Dennison et a l. | 455/408 |
| 5,550,646 | 8/1996 | Hassan et a l. | 348/18 |
| 5,557,320 | 9/1996 | Krebs | 348/12 |
| 5,579,239 | 11/1996 | Freeman et al. | 348/14 |
| 5,598,536 | 1/1997 | Slaughter, III et al. | 379/93.02 |
| 5,606,365 | 2/1997 | Maurinus et al. | 348/222 |

OTHER PUBLICATIONS

C3D™ Product Brochure, with attached article, P. Mowforth, A. Ayoub, J. Jin, K. Moss, T. Niblett, P. Siebert, C. Urquhart and D. Wray, "3D Imaging System for Clinical Applications," *Medical Electronics*, Dec. 1995, pp. 59–63.

*Primary Examiner*—Dwayne Bost
*Assistant Examiner*—Myran K. Wyche
*Attorney, Agent, or Firm*—Philip H. Albert; Townsend and Towsend and Crew LLP

[57] ABSTRACT

A portable image transfer system includes a digital still camera which captures images in digital form and stores the images in a camera memory, a cellular telephone transmitter, and a central processing unit (CPU). The CPU controls the camera memory to cause it to output data representing an image and the CPU controls the cellular telephone transmitter to cause a cellular telephone to transmit the data received from the camera memory. A receiving station is coupled to the cellular telephone transmitter by a cellular network to receive image data and store the images.

13 Claims, 1 Drawing Sheet

WIRELESS IMAGE TRANSFER FROM A DIGITAL STILL VIDEO CAMERA TO A NETWORKED COMPUTER

BACKGROUND OF THE INVENTION

The present invention relates to the field of digital still video cameras (DSVC's). More specifically, one embodiment of the present invention provides for improved storage of images generated by a DSVC. A portable DSVC is convenient for taking pictures at various locations because of the camera's size and weight. Unfortunately, as users have come to expect small weights and compact sizes for consumer electronics, DSVC's have tended to be limited in the number of images which could be stored. One solution to the problem is to add additional memory modules, but this is an expensive solution given that the memory modules must be miniaturized so as not to adversely affect the portability of the DSVC.

What is needed is a DSVC with a large image storage capacity where the image storage is not unduly expensive and does not unreasonably impact the size of the portable camera.

SUMMARY OF THE INVENTION

An improved portable image capture system is provided by virtue of the present invention. In one embodiment, a central processing unit (CPU), a modem and a cellular telephone transmitter are coupled to an image memory of a DSVC. The CPU is also coupled to a display and a command input device, which might be a voice activated device or a touch screen device integrated with the display. The CPU executes programs as needed to download images through the cellular telephone transmitter to a server station according to a protocol optimized for the connection available. Where the connection is a direct cellular telephone line, data is sent through the cellular telephone transmitter to cellular telephone system and it is received by a modem at the server station. A CPU at the server station directs the file to be stored in a data storage device, which is typically a large-capacity, inexpensive device such as a hard drive.

In variations of the present invention, the server station might perform complex analysis of the received images in order to instruct the DSVC to obtain additional images which the server station determines are needed for the analyses. The analyses include image resolution enhancement, stereoscopic matching, photocopying, and the like, as well as subjective evaluation of camera angle and image compression. In a specific implementation, the server station transmits images back to the remote station for viewing or forwarding to a local facsimile device or digital camera.

A further understanding of the nature and advantages of the inventions herein may be realized by reference to the remaining portion of the specification and the attached drawing.

DESCRIPTION OF THE PREFERRED EMBODIMENT

Figure 1:
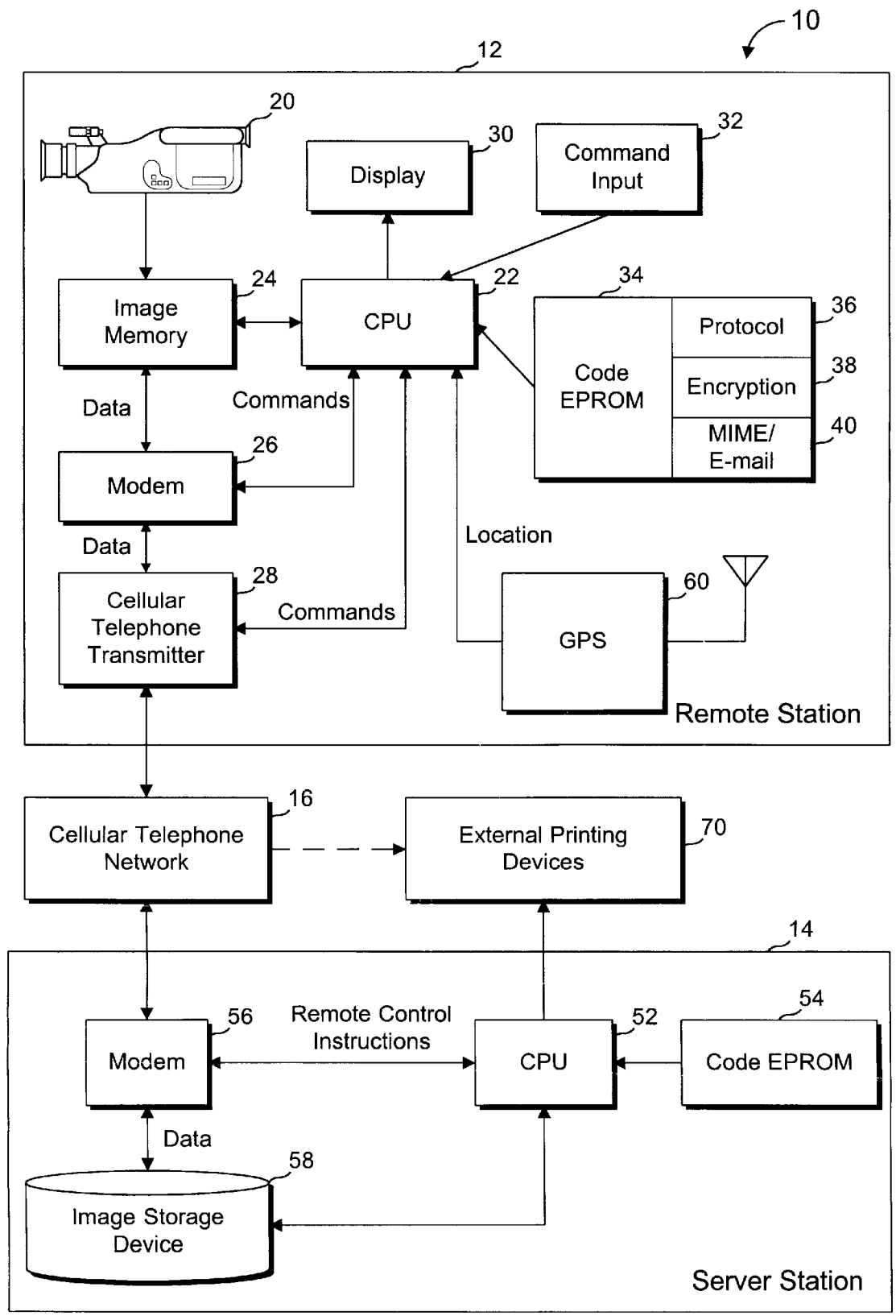
FIG. 1 is a block diagram of a remote station according to the present invention coupled to a server station via a cellular telephone system.

Referring to FIG. 1, a image transfer system 10 is shown with a remote station 12 coupled to a server station 14 via a cellular telephone system 16. Remote station 12 includes a digital camera made up of a capture device 20 and an image memory 24. Image memory 24 is a memory configured to hold a small number of images captured by capture device 20. In some embodiments, capture device 20 and image memory 24 are provided by a conventional digital still video camera, such as the Ricoh RDC-1 still video camera supplied by Ricoh Company, Ltd. of Tokyo Japan. Whether an existing DSVC is used or the camera is integrated, a CPU 22 is coupled to image memory 24, a modem 26 and a cellular telephone transmitter 28. The coupling between the various elements is such that CPU 22 can control image memory 24 to transfer data representing an image from image memory 24 to modem 26, which converts the image data into a signal suitable for transmission over a telephone line. Modem 26 is coupled to provide that signal to cellular telephone transmitter 28, which transmits the signal through cellular system 16 to modem 56 of server station 14.

Remote station 12 also includes a display 30 and a command input device 32 for interacting with the user of remote station 12 and accepting commands. The programs executed by CPU 22 are stored in a code EPROM 34 which respond to the commands sent by a user using input command device 32. Command input device 32 might be a voice activated device or a touch screen integrated with display 30. Code EPROM 34 includes code necessary to perform certain processing functions on an image before it is transmitted, such as a protocol packetizing program 36, an encryption module 38 and an e-mail handler 40.

Server station 14 is shown comprising modem 56 which is controlled by a CPU 52 which executes code stored in its own code EPROM 54. The programs stored in code EPROM 54 are instructions for CPU 52 to transfer data received by modem 56 into data storage device 58 while processing the received image to handle the requirements of the protocols used to send the image.

In one example of the operation of image transfer system 10, CPU 22 executes a program with instructions to periodically read an image from image memory 24 and mark the image as being read, allowing image memory 24 to be overwritten by subsequent images. As each image is read, the image data is encrypted and formatted as an electronic mail message. Where cellular system 16 is not a direct modem link, but a SLIP/PPP connection using TCP/IP, additional protocol packaging is performed on the image for transmission. When the images are received at server station 14, they are decrypted and unpackaged, then stored in data storage 58. If desired, some or all of the images in data storage 58 can be made available over the Internet. If a TCP/IP connection is used, CPU 20 might also execute a routine stored in code EPROM 34 to "ping" a destination before sending an image. The ping process sends a dummy message through a channel to determine whether or not the destination, such as server station 14, is available, ready and willing to receive data. If an affirmative response to the ping is received by remote station 12, only then does CPU 22 transmit the image package. If location information is to be included with each image, a Global Positioning System (GPS) receiver 60 can be coupled to CPU 22, such as a PCMCIA-compatible GPS receiver manufactured by Trimble Navigation of Sunnyvale, Calif.

Many uses of the present invention are contemplated, some of which are mentioned here, others of which are apparent after reading the disclosure. One use is the collection of vacation photos. Since the remote station is extremely portable, it is convenient for a vacationer to pack the remote station and carry it on their travels. When the capture of an image is desired, the vacationer activates remote station 12 using command input device 32, captures the image and, if image memory 24 is full, transmits images back to server station 14. This allows the vacationer to take as many pictures as desired without worrying about running out of film or image memory capacity, or needing to carry around sufficient memory to hold all the images from an entire trip.

Another application in television reporting. A field reporter could use the remote station to capture images at the scene of a news event and have those images transmitted to a server station controlled by the television studio, thus allowing up-to-the-minute news photos without requiring expensive and bulky equipment such as is now required in a news van.

In a typical operation, display 30 indicates the amount of free space remaining in image memory 24. When the user decides to free up additional memory by transmitting images already stored in image memory 24, the user initiates a command sequence using command input device 32. This begins the process of CPU 22 dialing a cellular number for server station 14 or otherwise setting up the link between remote station 12 and server station 14. CPU 22 then packages an image as required by the protocols, encryption or mailing procedures and directs the package as needed and flags the images in image memory 24 as being sent. One method for labeling images as being sent is to include a binary flag for each block of image memory 24 available for images. As an image is captured by capture device 20, the flag is set to indicate that the block is in use. As an image is transmitted by CPU 22, the flag is reset to indicate that the block is again available for image storage.

One application in which the present invention finds a use is in-field stereo image capture. With in-field stereo image capture, a camera is on location capturing an image and the server is processing the images. One problem with developing high quality stereo reconstructions is accuracy in image areas where the scene geometry changes quickly, i.e., sharp edges. The need for increased accuracy can be accommodated by capturing more images where needed to increase accuracy. Unfortunately, in the prior art, a photographer would either have to return from a site to process the images to determine if any more images are needed, often necessitating a second trip to the site, or have take the image processing computers to the site. With the present invention, images can be captured and sent to the server for processing with the server interactively responding with requests for the additional images. Thus, the server would process the captured images to determine if a good stereo image can be created. If portions of the stereo image are unacceptable, the server can signal, via the digital still video camera, the photographer to capture additional images.

Face recognition is a similar example. The capture device and the server could cooperate to interactively perform stereo matching, with the server requesting additional captures to improve face recognition. This would overcome the need for subjects to have stereo photographs stored in a laboratory.

Another use of the present invention is to obtain photocopies in locations, such as libraries, where it is not convenient to bring the item to be copied to a photocopy machine. At photocopier resolutions, a single uncompressed page image might require about 15 megabits of memory (1 bit/pixel ×400 dpi×8.5"×11"=1496 mbit). In order to reduce the memory requirements, the image can be compressed at the DSVC, but this requires considerable computation power at the DSVC. With the present invention, a low resolution image (e.g., 100 dpi) can be captured and sent to the server station. The server station then analyzes the low resolution image and identifies all white or black areas of the image as well as boundaries of the areas. To convert to a higher resolution image, the server represents each low resolution pixel with sixteen high resolution pixels. Where the image is all black or all white the high resolution pixels are correctly colored, while the blocks of sixteen high resolution pixels near an edge might not all be one color. To refine these areas, the server station sends image capture instructions to the DSVC instructing it to capture additional information from the edge areas.

Once the image is created at the server station with the desired high resolution, it can be sent to an printer or facsimile machine, typically one located near the user of the DSVC. A user of the DSVC desiring a photocopy could then indicate, using command input 32, the telephone number of a nearby facsimile machine. The DSVC would then obtain a low resolution image of the page of which a hard copy is desired, and send a low resolution image to server station 14. Server station 14 then determines the areas of the image for which additional information is needed. Server station 14 communicates the locations of those areas on the image and the DSVC recaptures those areas of the image. The increased resolution required for the high resolution image can be obtained by using a higher resolution lens on the DSVC, or simply capturing multiple images at low resolution and averaging. The resulting image can be compressed by server station 14 if the printing device is a facsimile machine, so that server station 14 need only transmit a compressed facsimile file. Alternatively, server station 14 can retransmit the compressed file to remote station 12, which would then dial the facsimile machine directly through cellular telephone network 16.

In FIG. 1, CPU 52 is shown connected to external printing devices 70, which could be facsimile machines, printers, or digital copiers. Other variations include the external printing devices 70 coupled to cellular telephone network 16, especially in the case of the external printing device being a facsimile machine. External printing device 70 might also be coupled directly to remote station 12. If the size and weight of remote station 12 is not too constrained, a printer might be included thereon. If desired, remote station 12 can be configured to display the captured image on display 30 or in a viewfinder of camera 20.

Yet another application is stereoscopic matching. Suppose remote station 12 is carried by a geologist who is backpacking to a remote region and desires to capture three-dimensional (3D) images of a landscape. Stereoscopic images are formed from two images of one scene taken at slight offset of each other. In many stereoscopic systems, the precise relative position of the camera between the two images is needed. However, it is now possible to perform stereographic "matching" (alignment of the two images to create the 3D effect) without alignment information. One such system is the C3D technology sold by The Turing Institute of Glasgow, Scotland. Combining that system with the present invention, the geologist could upload the dual images and have a C3D system at the server station immediately evaluate the images to determine if a lock on a 3D image can be made. If not, the server station sends a message to the geologist to reposition the camera and recapture an image, thus avoiding a second trip to the site for image capture.

The above description is illustrative and not restrictive. Many variations of the invention will become apparent to those skilled in the art upon review of this disclosure. For example, the server station 14 can be either a stationary system or a semi-portable system, so long as it need not be as portable as remote station 12. Also, the remote station 12 might be controlled from server station 14 by allowing remote station 12 to receive command messages from server station 14 over cellular system 16. The scope of the invention should, therefore, be determined not with reference to the above description, but instead should be determined with reference to the appended claims along with their full scope of equivalents.

What is claimed is:

1. A portable image transfer system comprising:

a digital still camera, at a remote station, which captures images in digital form and stores the images in a camera memory;

a cellular telephone transmitter;

a central processing unit (CPU) coupled to the camera memory and the cellular telephone transmitter, wherein the CPU controls the camera memory to cause it to output data representing an image and the CPU controls the cellular telephone transmitter to cause a cellular telephone to transmit the data output from the camera memory;

a receiving station coupled to the cellular telephone transmitter by a cellular network to receive image data;

means, at the receiving station, for image processing;

means for resetting the camera memory to be reused for subsequent images once an image is transmitted to the receiving station;

a return link for sending commands from the receiving station to the CPU, wherein the commands are directions for obtaining further images as needed by the means for image processing; and an image storage device coupled to the receiving station to store images received by the receiving station.

2. The apparatus of claim 1, wherein the CPU interfaces to a camera memory of an existing digital still camera.

3. The apparatus of claim 1, wherein the cellular telephone transmitter comprises:

a standard cellular telephone; and a cellular modem.

4. The apparatus of claim 1, further comprising means for packaging images as electronic mail messages prior to transmission by the cellular telephone transmitter.

5. The apparatus of claim 1, further comprising means for handling a serial line interface protocol connection between the cellular telephone transmitter and the receiving station.

6. The apparatus of claim 1, further comprising means for encrypting image data prior to transmission by the cellular telephone transmitter.

7. The apparatus of claim 1, further comprising a means for causing the digital still camera to capture images on a periodic basis, wherein the CPU is progammed to periodically transmit an image to free the camera memory for accepting subsequent images.

8. The apparatus of claim 1, further comprising means for determining a location of the portable image transfer system and means for including a location indication with each image.

9. The apparatus of claim 1, wherein the commands represent user directions to be displayed at the remote station directing the user to capture additional images as needed by the means for image processing.

10. The apparatus of claim 1, wherein the commands are directions directed at the remote station directing the digital still camera or CPU to capture additional image data as needed by the means for image processing.

11. The apparatus of claim 1, further comprising a remote printing device for printing images processed by the receiving station.

12. The apparatus of claim 11, wherein the remote printing device is one of a facsimile machine, a digital copier or a printer.

13. The apparatus of claim 8, further comprising means, within the receiving station, for using the location indication as a variable when processing said each image.

\* \* \* \* \*